(12) United States Patent
Grapov

(10) Patent No.: US 11,833,607 B2
(45) Date of Patent: *Dec. 5, 2023

(54) LASER ALIGNMENT APPARATUS AND SYSTEM FOR ALIGNMENT OF OUTPUT FIBER OF A FIBER LASER

(71) Applicant: IPG Photonics Corporation, Oxford, MA (US)

(72) Inventor: Yuri Grapov, Sutton, MA (US)

(73) Assignee: IPG PHOTONICS CORPORATION, Oxford, MA (US)

( * ) Notice: Subject to any disclaimer, the term of this patent is extended or adjusted under 35 U.S.C. 154(b) by 109 days.

This patent is subject to a terminal disclaimer.

(21) Appl. No.: 17/341,592

(22) Filed: Jun. 8, 2021

(65) Prior Publication Data

US 2021/0296843 A1    Sep. 23, 2021

Related U.S. Application Data

(63) Continuation of application No. 16/074,862, filed as application No. PCT/US2017/017448 on Feb. 10, 2017, now Pat. No. 11,052,482.

(Continued)

(51) Int. Cl.
| | |
|---|---|
| *B23K 26/042* | (2014.01) |
| *B23K 26/04* | (2014.01) |
| *B23K 26/06* | (2014.01) |
| *B23K 26/21* | (2014.01) |
| *G02B 6/42* | (2006.01) |
| *B23K 26/70* | (2014.01) |

(Continued)

(52) U.S. Cl.
CPC .......... *B23K 26/042* (2015.10); *B23K 26/043* (2013.01); *B23K 26/0643* (2013.01); *B23K 26/21* (2015.10); *B23K 26/38* (2013.01); *B23K 26/707* (2015.10); *G02B 6/4225* (2013.01); *G02B 6/4226* (2013.01); *H01S 3/005* (2013.01); *H01S 3/06704* (2013.01); *H01S 3/06708* (2013.01)

(58) Field of Classification Search
CPC .... B23K 26/042; B23K 26/21; B23K 26/707; B23K 26/0643; B23K 26/38; G02B 6/4225; G02B 6/4226; H01S 3/005; H01S 3/06704; H01S 3/06708
See application file for complete search history.

(56) References Cited

U.S. PATENT DOCUMENTS 11,052,482 B2 * 7/2021 Grapov ................ G02B 6/4226

* cited by examiner

*Primary Examiner* — Kevin K Pyo
*Assistant Examiner* — Don J Williams
(74) *Attorney, Agent, or Firm* — Grossman, Tucker, Perreault & Pfleger, PLLC

(57) ABSTRACT

A laser alignment system is used to align an output fiber with a fiber laser, for example, when coupling a feeding fiber to a process fiber using a beam coupler or switch. The alignment system includes a laser alignment apparatus that is coupled at a first end to the output fiber and at a second end to a beam dump/power meter. The alignment apparatus defines a light passage and a light capture chamber along the light passage. When light is not aligned into the core of the output fiber, at least a portion of the light passing out of the output fiber will be captured by the light capture chamber and detected by a photodetector in optical communication with the light capture chamber. By monitoring the readings of the photodetector, the output fiber may be properly aligned with the laser light from the fiber laser.

17 Claims, 5 Drawing Sheets

Related U.S. Application Data

(60) Provisional application No. 62/294,766, filed on Feb. 12, 2016.

(51) Int. Cl.
  *H01S 3/067* (2006.01)
  *H01S 3/00* (2006.01)
  *B23K 26/38* (2014.01)

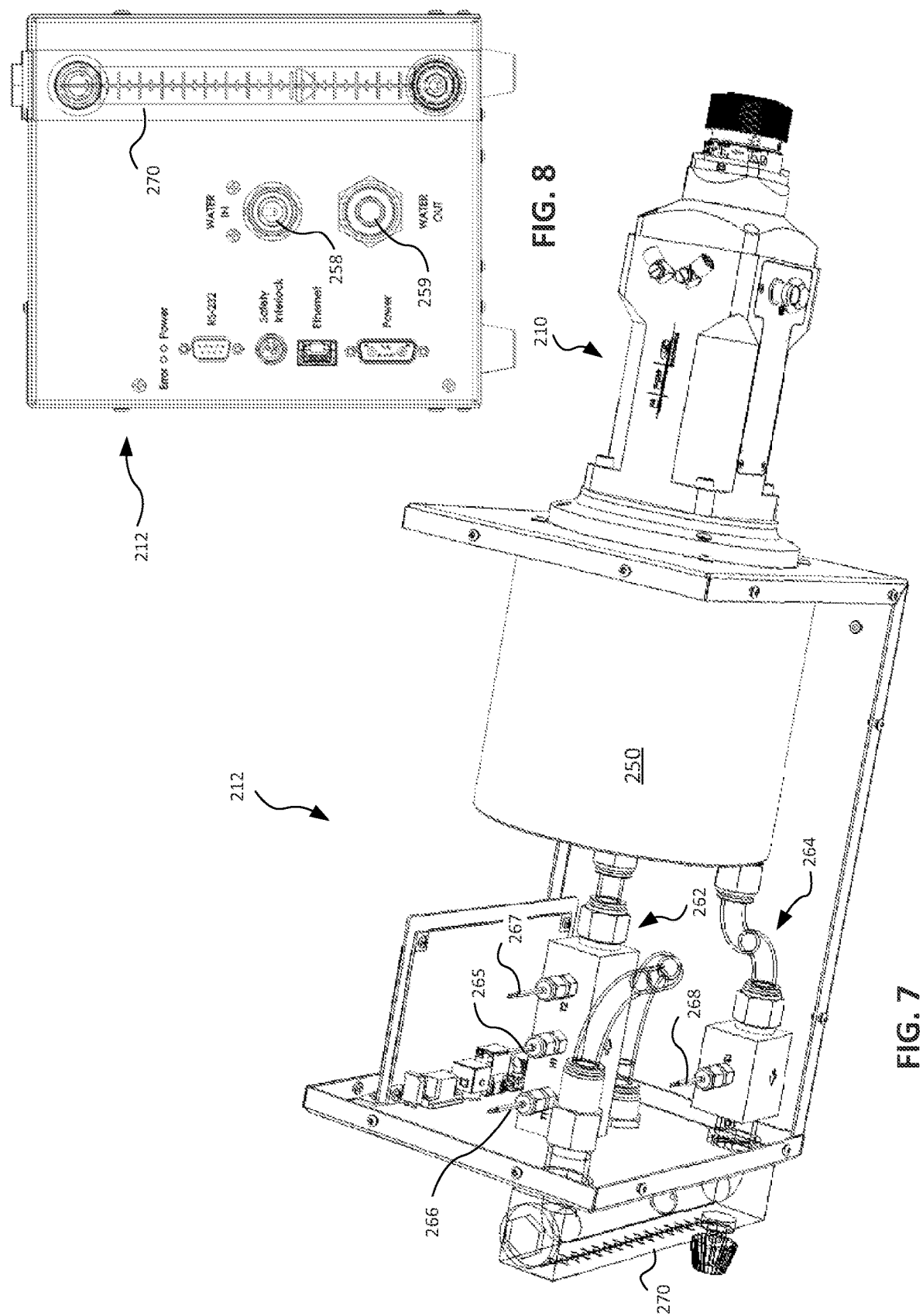

LASER ALIGNMENT APPARATUS AND SYSTEM FOR ALIGNMENT OF OUTPUT FIBER OF A FIBER LASER

CROSS-REFERENCE TO RELATED APPLICATIONS

This application is a continuation of application Ser. No. 16/074,862 filed Aug. 2, 2018, now Publication No. 2019-0039172; which is a 371 of International Application No. PCT/US17/17448 filed Feb. 10, 2017, which claims the benefit of U.S. Provisional Patent Application Ser. No. 62/294,766 filed Feb. 12, 2016, which is incorporated herein by reference.

TECHNICAL FIELD

The present invention relates to fiber lasers and more particularly, to a laser alignment apparatus and system for alignment of an output fiber of a fiber laser.

BACKGROUND INFORMATION

A fiber laser generally includes a feeding fiber connected directly to a laser source. A beam coupler or switch may be used to couple the feeding fiber to a process fiber, which is coupled to a laser processing head (e.g., a welding head or cutting head). Process fibers may have various lengths and core diameters as desired for a particular application. Thus, the use of the beam coupler or switch enables one or more different process fibers to be used and increases the versatility of the fiber laser.

If the feeding fiber and/or process fiber are not properly aligned, the laser light may not be properly coupled into the core of the fiber, which may adversely affect the performance of the laser processing head. Although the output fibers are typically aligned initially, the set up and use of the fiber laser in the field (e.g., connecting to a beam coupler or switch) may result in misalignment. The systems used to align the fibers during the initial set up are difficult to transport for use in the field. Other devices designed to provide alignment in the field have certain drawbacks. In particular, these devices may be susceptible to false positive readings, may not work with high power lasers, and may not work with a wide range of process fibers.

SUMMARY

Consistent with an embodiment, a laser alignment apparatus includes at least one housing defining a light passage extending from a first end to a second end and a light capture chamber located along the light passage. The light capture chamber has a reflective arcuate inner surface and an inner wall defining a central aperture coaxial with the light passage. The inner wall extends toward the first end and separates the aperture from a portion of the light capture chamber. The reflective arcuate inner surface of the light capture chamber is configured to reflect light passing from the first end toward the second end when the light is outside the central aperture. The laser alignment apparatus also includes at least one photodetector in optical communications with the light capture chamber and a fiber coupler adapter coupled to the first end of the housing for receiving a fiber coupler at one end of an output fiber optically coupled to a fiber laser.

Consistent with another embodiment, a laser alignment system includes a laser alignment apparatus including at least one housing defining a light passage extending from a first end to a second end and a light capture chamber located along the light passage. The light capture chamber has a reflective arcuate inner surface and an inner wall defining a central aperture coaxial with the light passage. The inner wall extends toward the first end and separates the aperture from a portion of the light capture chamber. The reflective arcuate inner surface of the light capture chamber is configured to reflect light passing from the first end toward the second end when the light is outside the central aperture. The laser alignment apparatus also includes at least one photodetector in optical communications with the light capture chamber and a fiber coupler adapter coupled to the first end of the housing for receiving a fiber coupler at one end of an output fiber optically coupled to a fiber laser. The laser alignment system further includes a voltmeter electrically connected to the at least one photodetector and a beam dump coupled to the second end of the housing.

Consistent with a further embodiment, a beam dump/power meter is provided for use with a laser alignment apparatus. The beam dump/power meter includes a dump chamber defined by reflective inner walls and a non-reflective floor, at least one water cooling passage proximate at least a portion of the walls and the floor, a water inlet channel fluidly coupled to the water cooling passage, a water outlet channel fluidly coupled to the water cooling passage, at least one inlet temperature sensor in the water inlet channel, and at least one outlet temperature sensor in the water outlet channel.

BRIEF DESCRIPTION OF THE DRAWINGS

These and other features and advantages will be better understood by reading the following detailed description, taken together with the drawings wherein:

FIG. 7 is a perspective view of the beam dump/power meter shown in FIG. 2 without the external housing.

FIG. 8 is a side view of a back panel of the beam dump/power meter shown in FIG. 2.

DETAILED DESCRIPTION

A laser alignment system, consistent with embodiments of the present disclosure, is used to align an output fiber with a fiber laser, for example, when coupling a feeding fiber to a process fiber using a beam coupler or switch. The laser alignment system includes a laser alignment apparatus that is coupled at a first end to the output fiber and at a second end to a beam dump/power meter. The laser alignment apparatus defines a light passage and a light capture chamber along the light passage. When light is not aligned into the core of the output fiber, at least a portion of the light passing out of the output fiber will be captured by the light capture chamber and detected by a photodetector in optical communication with the light capture chamber. By monitoring the readings of the photodetector on a voltmeter, the output fiber may be properly aligned with the laser light from the fiber laser, for example, by making adjustments in the beam coupler or switch.

Figure 1A:
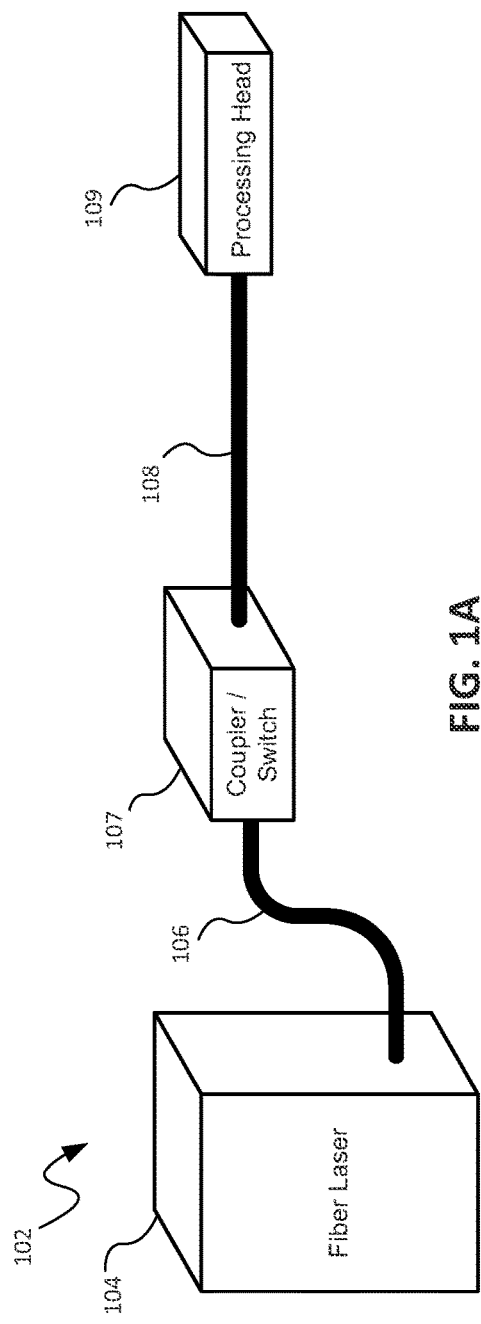
FIG. 1A is a schematic view of a fiber laser coupled to a laser process head.
Figure 1B:
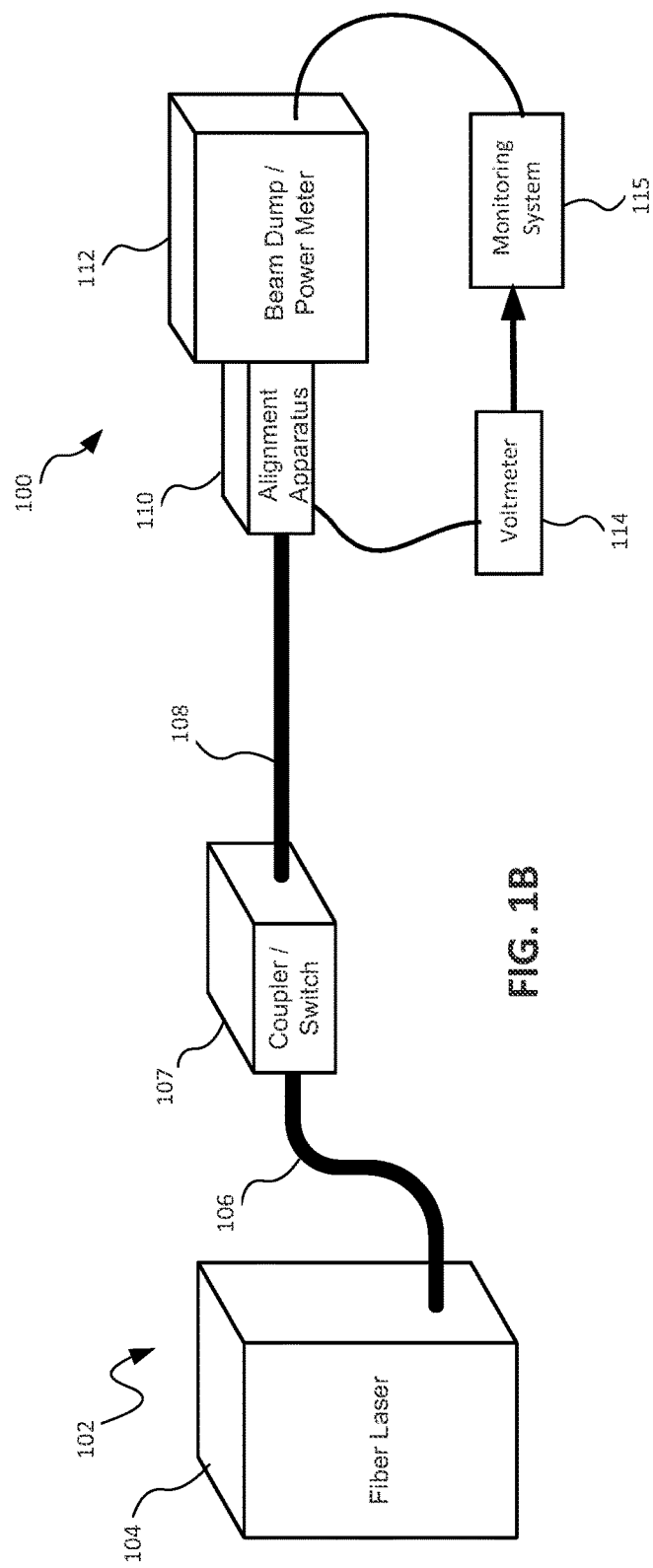
FIG. 1B is a schematic view of the fiber laser shown in FIG. 1A coupled to a laser alignment system, consistent with embodiments of the present disclosure.

Referring to FIGS. 1A and 1B, a laser alignment system 100, consistent with embodiments of the present disclosure, may be used with a fiber laser 102. The fiber laser 102 generally includes a laser source 104 and a feeding fiber 106 directly coupled to the laser source 104. A process fiber 108 may be coupled to the feeding fiber 106 using a coupling device 107 such as a beam coupler or switch. The process fiber 108 is coupled to a laser processing head 109 such as a laser welding head or a laser cutting head. In this example, the laser alignment system 100 may be used to align the process fiber 108 with the feeding fiber 106 in the coupling device 107. The laser alignment system 100 described herein may also be used to provide alignment of an output fiber with a fiber laser in other set ups, configurations, or scenarios (e.g., alignment of the feeding fiber 106 with the laser source 104 or splicing a fiber).

The alignment system 100 generally includes a laser alignment apparatus 110 having a first end coupled to an end of the process fiber 108 and a beam dump 112 coupled to a second end of the laser alignment apparatus 110. The laser alignment apparatus 110 includes a laser passage (not shown in FIG. 1B) that allows the light from the process fiber 108 to pass through to the beam dump 112, which safely disposes of the laser light. The laser alignment apparatus 110 also includes a light capture chamber (not shown in FIG. 1B) along the laser passage and a photodetector (not shown in FIG. 1B) in optical communication with the light capture chamber. When laser light is not aligned with the core of the process fiber 108 in the coupling device 107, a portion of the light emitted from the process fiber into the alignment apparatus 110 is captured by the light capture chamber and detected by the photodetector. A voltmeter 114 may be connected to the photodetector for measuring the amount of light detected by the photodetector, which is proportional to the amount of the light that is out of alignment. The beam dump 112 may also include a power meter for monitoring a power of the laser light that passes through the alignment apparatus.

A monitoring system 115 may be connected to the power meter for recording laser power data and may be coupled to the voltmeter 114 for recording voltmeter readings. The monitoring system 115 may include any combination of hardware and software (e.g., a general purpose computer) for receiving and processing data.

Figure 2:
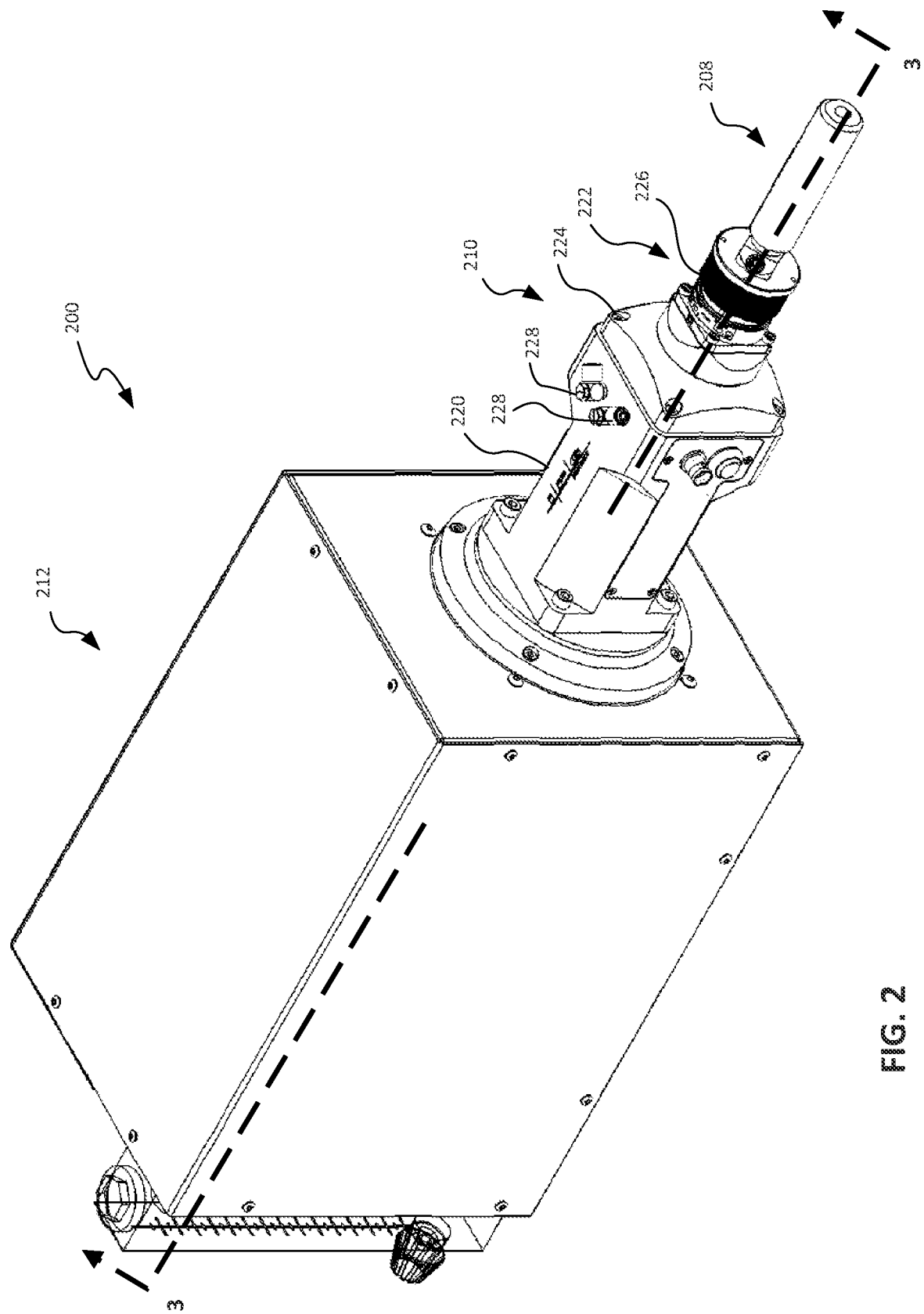
FIG. 2 is a perspective view of a laser alignment system including a laser alignment apparatus, consistent with an embodiment of the present disclosure.
Figure 3:
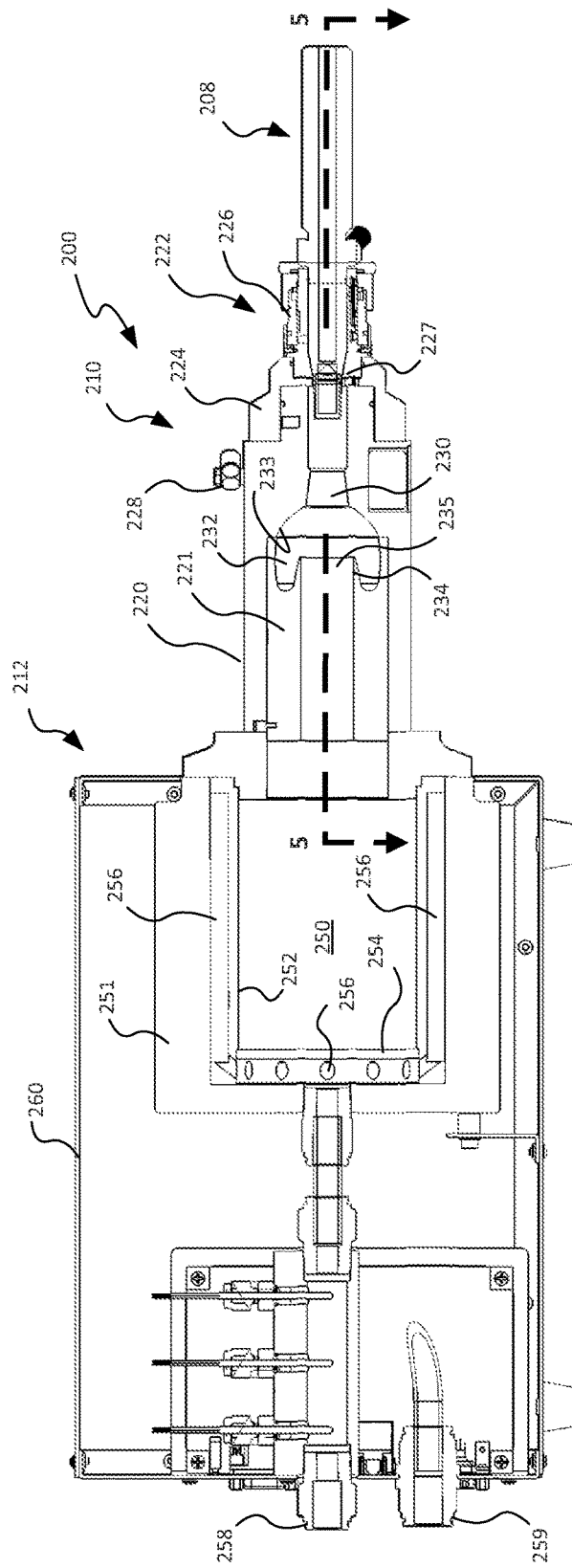
FIG. 3 is a cross-sectional view of the laser alignment system in FIG. 2 taken along line 3-3.

Referring to FIGS. 2 and 3, an embodiment of a laser alignment system 200 is described in greater detail. The laser alignment system 200 includes a laser alignment apparatus 210 coupled at a first end to an output fiber 208 and coupled at a second end to a beam dump/power meter 212. The laser alignment apparatus 210 includes an outer housing 220 that mounts to the beam dump/power meter 212 and a fiber coupler adapter 222 that receives a fiber connector (e.g., a QBH connector) at the end of the output fiber 208. The fiber coupler adapter 222 may be removably mounted to the housing 220 to allow different fiber coupler adapters to be used with different types of fiber connectors on different types of output fibers. In this embodiment, the fiber coupler adapter 222 includes an adapter base 224 that is removably mounted to the outer housing 220 (e.g., with threaded fasteners) and a bayonet type coupler 226 mounted on the adapter base 224. The bayonet type coupler 226 may include known couplers (e.g., as used on collimators or laser processing heads) for coupling with standard fiber connectors (e.g., QBH connectors) on process fibers.

The housing 220 may also include a water inlet and outlet 228 connected to one or more water passageways or regions (e.g., around the light capture chamber) for cooling the laser alignment apparatus 210. A safety interlock conductor may also be provided through the laser alignment apparatus 210 and the beam dump/power meter 212 to provide a safety interlock feature, for example, to disable the laser in the event the laser alignment apparatus 210 becomes disconnected from the beam dump/power meter 212 and/or the process fiber 208. The water cooling and safety interlock allow the laser alignment apparatus 210 to be used safely with higher power lasers.

FIG. 3 shows the inside of the laser alignment apparatus 210 and the beam dump/power meter 212 in greater detail. The laser alignment apparatus 210 includes an inner housing 221 inside the outer housing 220. The outer housing 220 and the inner housing 221 together define the light passage 230 and the light capture chamber 232 along the light passage 230. The water cooling passage(s) or region(s) (not shown) may be formed between the outer housing 220 and the inner housing 221 around the light capture chamber 232. In other embodiments, a laser alignment apparatus may include a single housing or more than two housings defining the light passage and light capture chamber.

The light passage 230 extends from the first end to the second end of the outer housing 220. An inner wall 234 defines a central aperture 235 coaxial with the light passage 230 and extends toward the first end of the outer housing 220, separating the central aperture 235 from a portion of the light capture chamber 232. In this embodiment, the light capture chamber 232 has a reflective arcuate inner surface 233. The reflective arcuate inner surface 233 may be coated or plated with nickel to provide reflectivity. The arcuate shape of the inner surface 233 allows reflected light to bounce around similar to an integrating sphere, as will be described in greater detail below.

The beam dump/power meter 212 includes a beam dump chamber 250 defined by an inner reflective wall 252 and a non-reflective or absorbent floor 254. The inner wall 252 may be cylindrical and nickel plated to provide the desired reflectivity and the floor 254 may be black to provide the desired absorption. The beam dump/power meter 212 also includes one or more water circulation passages or regions 256 around the inner walls 252 and the floor 254 and enclosed by an outer beam dump housing 251. The reflection of the light around the chamber 250 provides uniform heat transfer to the water passing through the water circulation passages or regions 256. A water inlet 258 and a water outlet 259 are fluidly coupled to the water circulation regions 256 to allow water to flow around the walls 252 and floor 254 for absorbing the energy of the laser light in the chamber 250. The temperature of the inlet water and the outlet water may be measured to determine the power of the laser light in the chamber 250, as will be described in greater detail below. The illustrated embodiment of the beam dump/power meter 212 also includes an outer housing 260.

Figure 4:
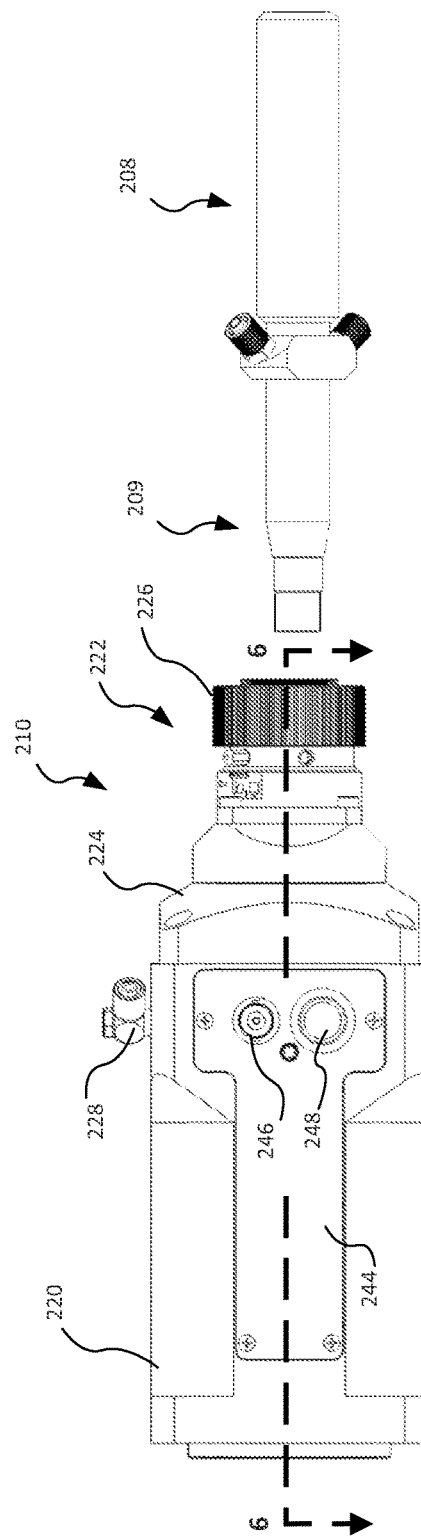
FIG. 4 is an exploded view of a fiber coupler of a process fiber detached from a fiber coupler adapter on a laser alignment apparatus shown in FIG. 2.
Figure 5:
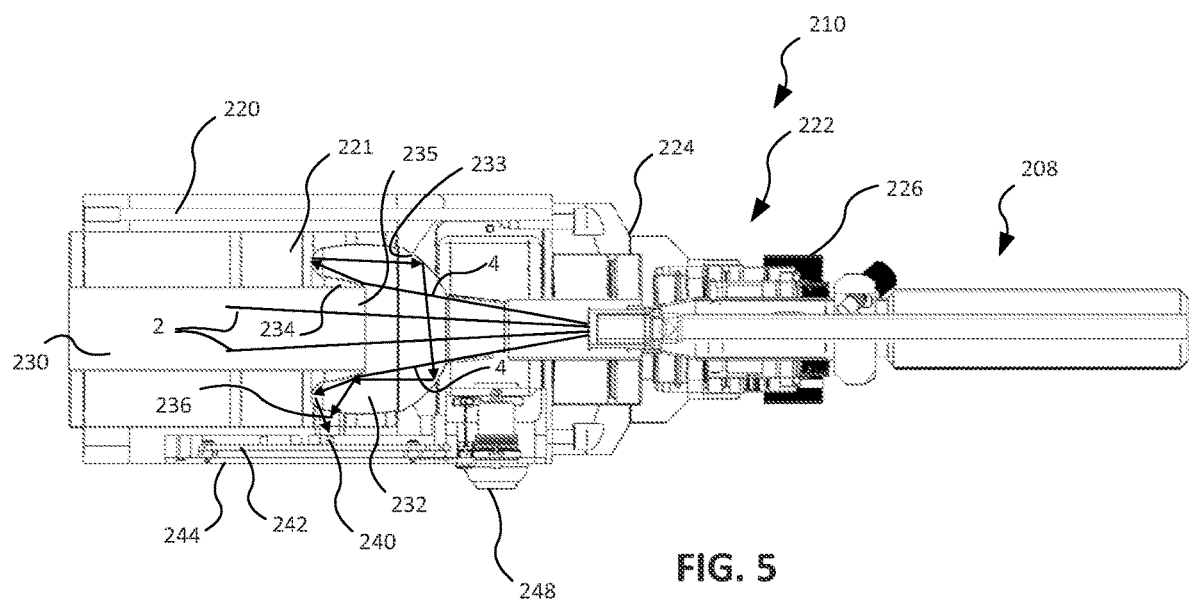
FIG. 5 is a cross-sectional view of the laser alignment apparatus in FIG. 3 taken along line 5-5.
Figure 6:
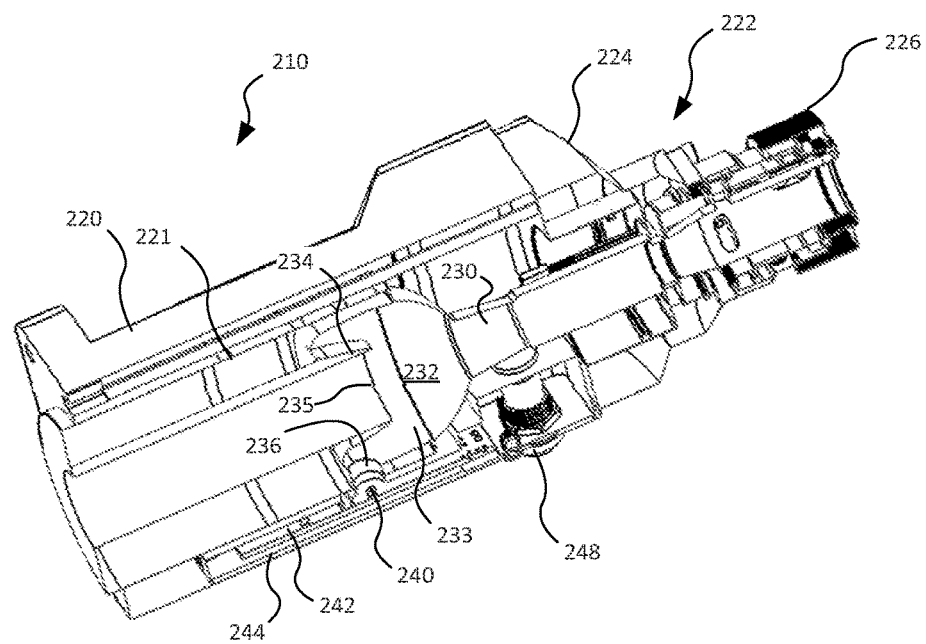
FIG. 6 is a cross-sectional view of the laser alignment apparatus in FIG. 4 taken along line 6-6.

Referring to FIGS. 4-6, the laser alignment apparatus 210 is described in greater detail. FIG. 4 shows a fiber coupler 209 (e.g., a quartz block QBH connector) at the end of the process fiber 208 being coupled with the bayonet type coupler 226 at the first end of the laser alignment apparatus

210. When the fiber coupler 209 is received in the fiber coupler adapter 222, a metal jacket 227 within the fiber coupler adapter 222 (see FIG. 3) holds and centers the fiber coupler 209 to provide proper alignment of the cone of light from the quartz block with the light passage 230. For different output fibers (e.g., different fiber sizes), the cone of light may be different and a different fiber coupler adapter 222 may be used to assure proper alignment or positioning of the fiber coupler. In particular, the adapter base 224 may be removably mounted to the outer housing 220 with threaded fasteners to allow different types of fiber adapter couplers to be used with different sizes or types of process fibers and to provide the proper positioning with the light passage 230 in the laser alignment apparatus 210.

As shown in FIGS. 5 and 6, the laser alignment apparatus 210 further includes at least one photodetector 240 (e.g., a photodiode) in optical communication with the light capture chamber 232 for detecting the light being reflected in the chamber. In the illustrated embodiment, the light capture chamber 232 includes a side aperture 236 through the reflective arcuate inner wall 233 and the photodetector 240 is aligned with the side aperture 236 to receive reflected light that passes through the side aperture 236. In this embodiment, the photodetector 240 is located on a circuit board 242 mounted in a side of the outer housing 220 and accessible through a panel 244 (FIG. 4). Although one photodetector 240 is shown, additional photodetectors may be used, for example, on other sides of the light capture chamber 232.

A voltmeter connector 246 (FIG. 4) is electrically connected to the photodetector 240 (e.g., via the circuit board 242) and mounted on the side of the outer housing 220 (e.g., on the panel 244). A power or on/off button 248 is also electrically connected to the photodetector 240 (e.g., via the circuit board 242) and mounted on the side of the outer housing 220 (e.g., on the panel 244). Other structures and configurations for electrically connecting the photodetector to a voltmeter are also contemplated and within the scope of the present disclosure.

The alignment of laser light with the distal end of the process fiber 208 (e.g., in a beam switch or coupler) affects the divergence of the cone of light emitted from the proximal end of the process fiber 208 coupled to the laser alignment apparatus 210. Proper alignment of laser light with the distal end the process fiber 208 (e.g., primarily into the core of the fiber) should result in a cone of light 2 emitted from the proximal end of the process fiber 208 into the laser passage 230 with most of the light passing through toward the beam dump without being captured in the light capture chamber 232. Improper alignment of laser light with the distal end of the process fiber 208 (e.g., a significant portion of light is coupled into the cladding layer) results in a cone of light 4 that diverges sufficiently such that the cone of light 4 extends outside the central aperture 235 and into the light capture chamber 232. This captured light is then reflected and scattered by the reflective arcuate inner surface 233 (as indicated generally by the arrows) and the reflected light passing through the side aperture 236 is detected by the photodetector 240. The arcuate shape of the inner surface 233 provides an integrating sphere effect that facilitates uniformity of the light detected by the photodetector 240 and thus prevents false positive readings.

According to one method of use, a voltmeter is connected to the voltmeter connector 246 and the proximal end of the process fiber 208 is coupled to the fiber coupler adapter 222 of the laser alignment apparatus 210. The distal end of the process fiber 208 is coupled to a beam coupler or switch including a focus lens that is adjustable in the x, y, z axes to adjust alignment of the laser light with the core of the process fiber. With the laser powered on, the user may adjust the focus lens in the x, y, z axes while monitoring the photodetector readings on the voltmeter. Lower voltmeter readings indicate that less light is being detected by the photodetector and thus less light is being captured by the light capture chamber 232. By adjusting the focus lens in the x, y and/or z axes to reduce the voltmeter readings, the laser light may be properly aligned with the core of the process fiber 208 to provide a cone of light with the desired divergence from the process fiber 208 (e.g., from the quartz block).

Referring to FIGS. 7 and 8, the beam dump/power meter 212 (shown in FIG. 7 without the outer housing) is described in greater detail. A water inlet channel 262 provides water from the water inlet 258 to the water cooling passages or regions around the chamber 250 and a water outlet channel 264 provides water from the water passages or regions around the chamber 250 to the water outlet 259. A flow meter 270 is fluidly coupled to the water outlet channel 264 to measure the flow through the system.

The water inlet channel 262 includes at least one inlet temperature sensor 266 to measure an inlet water temperature and the water outlet channel 264 includes at least one outlet temperature sensor 268 to measure an outlet water temperature. By measuring the water temperature at the inlet and outlet, the power transferred to the water from the laser may be measured. These power measurements may also be used to assist in the alignment. In the illustrated embodiment, a heater 265 and an additional temperature sensor 267 are used to provide calibration. In one example, the first inlet temperature sensor 266 takes a first inlet temperature, the heater 265 provides heat at a predetermined power (e.g., 100 W) and the second inlet temperature sensor 267 takes a second inlet temperature after the heater 265 to measure the effect of the heat on the water. Temperature sensors (not shown) may also be used at the inlet and/or outlet of the chamber 250 as a safety measure.

As shown in FIG. 8, a back panel 261 of the beam dump/power meter 212 includes the water inlet 258, the water outlet 259, the flow meter 270, and various electrical connections (e.g., power, Ethernet, safety interlock, RS-232). Other configurations of the beam dump/power meter 212 are also contemplated and within the scope of the present disclosure.

Accordingly, the laser alignment system, consistent with the embodiments described herein, is relatively portable and is capable of providing improved alignment between a variety of output fibers and a fiber laser including high power fiber lasers.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser alignment apparatus extending along a longitudinal axis and comprising:
   at least one housing defining an axial light passage, which extends between axially spaced first and second ends, and a light capture chamber located along the light passage, the light capture chamber having a reflective arcuate inner surface and an inner wall defining a central aperture coaxial with the light passage, wherein the inner wall extends toward the first end and separates the aperture from a portion of the light capture chamber, and wherein the reflective arcuate inner surface of the light capture chamber is configured to reflect and scatter light passing from the first end toward the second end when the light is outside the central aperture;

at least one photodetector in optical communications with the light capture chamber; and a fiber coupler adapter coupled to the first end of and coaxial with the housing for receiving a fiber coupler at one end of an output fiber optically coupled to a fiber laser.

2. The laser alignment apparatus of claim 1 wherein the fiber coupler adapter is removably mounted to the housing with fasteners.

3. The laser alignment apparatus of claim 1 wherein at least one housing includes an outer housing and an inner housing.

4. The laser alignment apparatus of claim 1 further comprising a voltmeter connector mounted on an outside of the housing for connecting to a voltmeter, the voltmeter connector being electrically connected to the photodetector.

5. The laser alignment apparatus of claim 1 wherein the light capture chamber includes at least one side aperture in a side of the light capture chamber and wherein the at least one photodetector is aligned with the at least one side aperture.

6. The laser alignment apparatus of claim 1 wherein the at least one housing defines water channels for receiving water for water cooling.

7. The laser alignment apparatus of claim 1 wherein the fiber coupler adapter includes an adapter base and a bayonet type coupler mounted to the adapter base, wherein the adapter base is configured to be removably attached to the housing.

8. The laser alignment apparatus of claim 1 wherein the second end of the housing is configured to be mounted to a beam dump or a power meter.

9. The laser alignment apparatus of claim 1 wherein the reflective arcuate inner surface is nickel plated.

10. The laser alignment apparatus of claim 1, wherein the arcuate shape of the reflective arcuate inner surface provides an integrating sphere effect that facilitates uniformity of light detected by the at least one photodetector.

11. A laser alignment system extending along a longitudinal axis and comprising:

at least one housing defining an axial light passage, which extends between axially spaced first and second ends, and a light capture chamber located along the light passage, the light capture chamber having a reflective arcuate inner surface and an inner wall defining a central aperture coaxial with the light passageway, wherein the inner wall extends toward the first end separates the aperture from a portion of the light capture chamber, and wherein the reflective arcuate inner surface of the light capture chamber is configured to reflect light passing from the first end toward the second end when the light is outside the central aperture;

at least one photodetector in optical communications with the light capture chamber;

a fiber coupler adapter coupled to the first end of and coaxial with the housing for receiving a fiber coupler at one end of an output fiber optically coupled to a fiber laser; and a beam dump coupled to the second end of and coaxial with the housing, the beam dump including a dump chamber defined by reflective inner walls and a non-reflective floor.

12. The laser alignment system of claim 11 wherein the beam dump includes a power meter.

13. The laser alignment system of claim 11 wherein the beam dump further includes:

at least one water cooling passage proximate at least a portion of the walls and the floor;

a water inlet channel fluidly coupled to the water cooling passage; and a water outlet channel fluidly coupled to the water cooling passage.

14. The laser alignment system of claim 13 further including at least one inlet temperature sensor in the water inlet channel and at least one outlet temperature sensor in the water outlet channel.

15. The laser alignment system of claim 14 further including first and second inlet temperature sensors in the water inlet channel and a heater between the first and second inlet temperature sensors.

16. The laser alignment system of claim 11 further including a safety interlock conductor extending between the laser alignment apparatus and the beam dump.

17. The laser alignment system of claim 11 further comprising a voltmeter electrically connected to the at least one photodetector.

* * * * *